United States Patent
Levy et al.

(10) Patent No.: US 12,306,945 B2
(45) Date of Patent: May 20, 2025

(54) ADVANCED RANSOMWARE DETECTION

(71) Applicant: Palo Alto Networks (Israel Analytics) Ltd., Tel Aviv (IL)

(72) Inventors: Erez Levy, Petach Tikva (IL); Or Chechik, Rishon Lezion (IL); Liav Zigelbaum, Holon (IL); Eldar Aharoni, Holon (IL)

(73) Assignee: Palo Alto Networks Israel Services Ltd, Tel-Aviv (IL)

( * ) Notice: Subject to any disclaimer, the term of this patent is extended or adjusted under 35 U.S.C. 154(b) by 0 days.

(21) Appl. No.: 17/979,004

(22) Filed: Nov. 2, 2022

(65) Prior Publication Data

US 2023/0084691 A1 Mar. 16, 2023

Related U.S. Application Data

(62) Division of application No. 16/939,013, filed on Jul. 26, 2020, now Pat. No. 11,520,886.

(51) Int. Cl.
  *G06F 21/55* (2013.01)
  *G06F 21/56* (2013.01)
  *H04L 9/40* (2022.01)

(52) U.S. Cl.
  CPC .......... *G06F 21/566* (2013.01); *G06F 21/554* (2013.01); *G06F 21/565* (2013.01); *G06F 2221/034* (2013.01)

(58) Field of Classification Search
  CPC .... G06F 21/566; G06F 21/554; G06F 21/565; G06F 2221/034; G06F 21/55; G06F 21/56; G06F 21/62; H04L 9/40
  See application file for complete search history.

(56) References Cited

U.S. PATENT DOCUMENTS

| | | | |
|---|---|---|---|
| 8,205,257 B1 * | 6/2012 | Satish | G06F 21/577 726/25 |
| 8,646,076 B1 | 2/2014 | Lim et al. | |
| 9,659,182 B1 | 5/2017 | Roundy et al. | |
| 10,860,718 B2 | 12/2020 | Seetharamaiah et al. | |
| 11,216,559 B1 | 1/2022 | Gu et al. | |
| 11,409,868 B2 | 8/2022 | Reid et al. | |

(Continued)

FOREIGN PATENT DOCUMENTS

| | | | | |
|---|---|---|---|---|
| WO | 2008056944 A1 | 5/2008 | | |
| WO | WO-2022109664 A1 * | 6/2022 | ......... | G06F 11/3006 |
| WO | 2022248920 A1 | 12/2022 | | |

OTHER PUBLICATIONS

AU Application # 2021319159 Office Action dated May 25, 2023.

(Continued)

*Primary Examiner* — Jayesh M Jhaveri
(74) *Attorney, Agent, or Firm* — Meitar Patents Ltd.; Daniel Kligler

(57) ABSTRACT

Methods, apparatuses and computer program products implement embodiments of the present invention that include protecting a computer system coupled to a storage device by detecting an executing process that performed a specific type of modification to a number of files stored on the storage device. A processor compares the detected number to a specified threshold and initiates, on the executing process, a preventive action in response to determining that the detected number exceeds the specified threshold.

14 Claims, 6 Drawing Sheets

(56) References Cited

U.S. PATENT DOCUMENTS

| | | | |
|---|---|---|---|
| 11,616,810 B2* | 3/2023 | Hansen | G06F 21/552 |
| | | | 713/188 |
| 11,934,801 B2 | 3/2024 | Rahmani et al. | |
| 2004/0049693 A1 | 3/2004 | Douglas | |
| 2015/0213260 A1 | 7/2015 | Park | |
| 2015/0215335 A1 | 7/2015 | Giuliani et al. | |
| 2016/0055337 A1 | 2/2016 | El-Moussa | |
| 2016/0232347 A1 | 8/2016 | Badishi | |
| 2018/0115577 A1* | 4/2018 | Shukla | G06F 21/55 |
| 2018/0189490 A1* | 7/2018 | Maciejak | G06F 21/566 |
| 2019/0109870 A1* | 4/2019 | Bedhapudi | H04L 63/0428 |
| 2019/0121978 A1* | 4/2019 | Kraemer | G06F 21/565 |
| 2019/0138727 A1* | 5/2019 | Dontov | G06F 11/1464 |
| 2019/0318090 A1 | 10/2019 | Sandoval et al. | |
| 2020/0342100 A1 | 10/2020 | Goldstein et al. | |
| 2021/0152595 A1* | 5/2021 | Hansen | G06F 21/568 |
| 2022/0284095 A1 | 9/2022 | Ahmed | |

OTHER PUBLICATIONS

Cristalli et al., "Trusted Execution Path for Protecting Java Applications Against Deserialization of Untrusted Data," Proceedings, International Conference, ICB 2007—Advances in Biometrics, Springer Nature Switzerland AG, pp. 445-464, year 2018.

Wikipedia, "Java Remote Method Invocation," pp. 1-4, last edited Dec. 26, 2020.

Wikipedia, "Metasploit Project," pp. 1-7, last edited Jun. 7, 2022.

Cynet, "Cobalt Strike: White Hat Hacker Powerhouse in the Wrong Hands," pp. 1-6, last updated Jun. 27, 2022, as downloaded from https://web.archive.org/web/20220627023847/https://www.cynet.com/network-attacks/cobalt-strike-white-hat-hacker-powerhouse-in-the-wrong-hands/.

Shah, "Analyzing CVE-2017-9791: Apache Struts Vulnerability Can Lead to Remote Code Execution,", McAfee, pp. 1-7, Jul. 19, 2017, as downloaded from https://www.mcafee.com/blogs/other-blogs/mcafee-labs/analyzing-cve-2017-9791-apache-struts-vulnerability-can-lead-remote-code-execution/.

Frohoff, "A Proof-of-Concept Tool for Generating Payloads that Exploit unsafe Java Object Deserialization," github.com, pp. 1-3, Jul. 16, 2022, as downloaded from https://github.com/frohoff/ysoserial.

Wikipedia, "Return-oriented Programming," pp. 1-6, last edited Mar. 31, 2020, as downloaded from https://web.archive.org/web/20200403142512/https://en.wikipedia.org/wiki/Return-oriented_programming.

McNab, "Network Security Assessment", 2nd edition, Chapter 16 (Exploitation Frameworks), pp. 393-414, Oct. 2007.

Balakrishnan, "Understanding Java Agents," Tutorial, pp. 1-8, Jul. 6, 2020, as downloaded from https://dzone.com/articles/java-agent-1.

Wikipedia, "Java Virtual Machine," pp. 1-8, last update Oct. 25, 2022.

International Application # PCT/IB2024/051414 Search Report dated Apr. 17, 2024.

U.S. Pat. No. 118886585 B1, Jan. 30, 2024, Davis.

* cited by examiner

ADVANCED RANSOMWARE DETECTION

CROSS-REFERENCE TO RELATED APPLICATION

This application is a division of U.S. patent application Ser. No. 16/939,013, filed Jul. 26, 2020, whose disclosure is incorporated herein by reference.

FIELD OF THE INVENTION

The present invention relates generally to computer security, and particularly to detecting a ransomware attack on a computer system.

BACKGROUND OF THE INVENTION

Malware is an abbreviation for malicious software (e.g., executable code, scripts and active content) that when executed, intentionally causes damage to a computer or to data stored on the computer. Examples of malware include computer viruses, worms, Trojan horses, ransomware, spyware, adware, and scareware.

Ransomware (i.e., one of the types of malware cited supra) is a type of malicious software that threatens to perpetually block access to data accessible to a computer unless a ransom is paid. Data is typically blocked by encrypting files on the computer that store the data, thereby making the files unusable, a ransom payment is demanded in order to decrypt them.

Ransomware attacks are typically carried out using a Trojan that is disguised as a legitimate file carrying the malware that a user of the computer is tricked into downloading or opening when received as an email attachment. Some other ransomware attacks can be carried through a "worm" travelling automatically between computers without requiring any user interaction to infect the computer(s) with the malware.

Once a computer is infected, the ransomware systematically encrypts some or all of the data portions of storage volumes accessible to the computer, making the data inaccessible to applications executing on the device. In some configurations, ransomware comprises an application that reads data from the files, encrypts the data, and overwrites the files with the encrypted data. When a ransom is paid, decryption software is provided by the attacker that enables the computer to decrypt back the data and reinstate it to the state prior to the attack.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method for protecting a computer system coupled to a storage device, including storing, to the storage device, a set of protected files and a decoy file, wherein any modification to the decoy file indicates a cyber-attack on the computer system, receiving a request from a process executing on the computing device to enumerate files stored on the storage device, analyzing, by a processor, the process so as to classify the process as benign or suspicious, enumerating the protected files to the process, and enumerating the decoy file to the process only upon classifying the process as suspicious.

In one embodiment, the cyber-attack includes a ransomware attack.

In another embodiment, the method also includes initiating a protective action on the process.

In an additional embodiment, initiating the preventive action includes identifying a causality chain for the process, and initiating the preventive action on the causality chain.

In a further embodiment, analyzing the process includes identifying, on the storage device, an executable file that launched the process, and performing a static analysis on the identified executable file.

In a supplemental embodiment, performing the static analysis includes identifying a name of the executable file, comparing the identified name to a list of whitelisted names, classifying the process as suspicious if the identified name does not match any of the whitelisted names, and classifying the process as benign if the identified name does not match any of the whitelisted names.

In one embodiment, performing the static analysis includes identifying a path of the executable file, comparing the identified path to a list of whitelisted paths, classifying the process as suspicious if the identified path does not match any of the whitelisted paths, and classifying the process as benign if the identified path does not match any of the whitelisted paths.

In another embodiment, performing the static analysis includes computing a signature for the executable file, comparing the computed signature to a list of whitelisted signatures, classifying the process as suspicious if the computed signature does not match any of the whitelisted signatures, and classifying the process as benign if the computed signature does not match any of the whitelisted signatures.

In an additional embodiment, performing the static analysis includes computing a hash value for the executable file, comparing the computed hash value to a list of whitelisted hash values, classifying the process as suspicious if the computed hash value does not match any of the whitelisted hash values, and classifying the process as benign if the computed hash value does not match any of the whitelisted hash values.

In one embodiment, analyzing the process includes performing a dynamic analysis on the process.

In another embodiment, performing the dynamic analysis includes identifying a thread in the process that conveyed the request to enumerate the files, determining whether or not the thread was injected into the process, classifying the process as suspicious upon determining that the thread was to be injected into the process, and classifying the thread as benign upon determining that the thread was not injected into the process.

In an additional embodiment, performing the dynamic analysis includes identifying a thread in the process that conveyed the request to enumerate the files, determining whether or not the thread includes shellcode, classifying the process as suspicious upon determining that the thread includes shellcode, and classifying the thread as benign upon determining that the thread does not include shellcode.

In a further embodiment, performing the dynamic analysis includes identifying a thread in the process that conveyed the request to enumerate the files, the thread including a thread stack, determining whether or not the thread stack includes a memory address for a shared library for a graphical user interface, classifying the process as suspicious upon determining that the thread stack does not include includes a memory address for the shared library, and classifying the thread as benign upon determining that the thread stack does includes a memory address for the shared library.

There is also provided, in accordance with an embodiment of the present invention, an apparatus for protecting a computer system, including a storage device configured to store a set of protected files and a decoy file, wherein any modification to the decoy file indicates a cyber-attack on the computer system, and a processor configured to receive a request from a process executing on the computing device to enumerate files stored on the storage device, to analyze the process so as to classify the process as benign or suspicious, to enumerate the protected files to the process, and to enumerate the decoy file to the process in response to classifying the process as suspicious.

There is additionally provided, in accordance with an embodiment of the present invention, a computer software product for protecting a computing system, the product including a non-transitory computer-readable medium, in which program instructions are stored, which instructions, when read by a computer, cause the computer to store, to a storage device coupled to the computer system, a set of protected files and a decoy file, wherein any modification to the decoy file indicates a cyber-attack on the computer system to receive a request from a process executing on the computing device to enumerate files stored on the storage device, to analyze the process so as to classify the process as benign or suspicious, to enumerate the protected files to the process; and to enumerate the decoy file to the process in response to classifying the process as suspicious.

There is further provided, in accordance with an embodiment of the present invention, a method for protecting a computer system coupled to a storage device, including detecting an executing process that performed a specific type of modification to a number of files stored on the storage device, comparing, by a processor, the detected number to a specified threshold, and initiating, on the executing process, a preventive action in response to determining that the detected number exceeds the specified threshold.

In one embodiment, initiating the preventive action includes identifying a causality chain for the executing process, and initiating the preventive action on the causality chain.

In another embodiment, the specific type of modification includes renaming the file extensions of the files to identical file extensions.

In an additional embodiment, the specific type of modification includes renaming the file extensions of the files to one or more specified file extensions.

In a further embodiment, the specific type of modification includes encrypting the files.

There is also provided, in accordance with an embodiment of the present invention, an apparatus for protecting a computer system, including a storage device configured to store a plurality of files, a memory, and a processor configured to detect, in the memory, an executing process that performed a specific type of modification to a number of files stored on the storage device, to compare, the detected number to a specified threshold and to initiate, on the executing process, a preventive action in response to determining that the detected number exceeds the specified threshold.

There is additionally provided, in accordance with an embodiment of the present invention, a computer software product for protecting a computing system, the product including a non-transitory computer-readable medium, in which program instructions are stored, which instructions, when read by a computer, cause the computer to detect an executing process that performed a specific type of modification to a number of files stored on the storage device, to compare the detected number to a specified threshold, and to initiate, on the executing process, a preventive action in response to determining that the detected number exceeds the specified threshold.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1A:
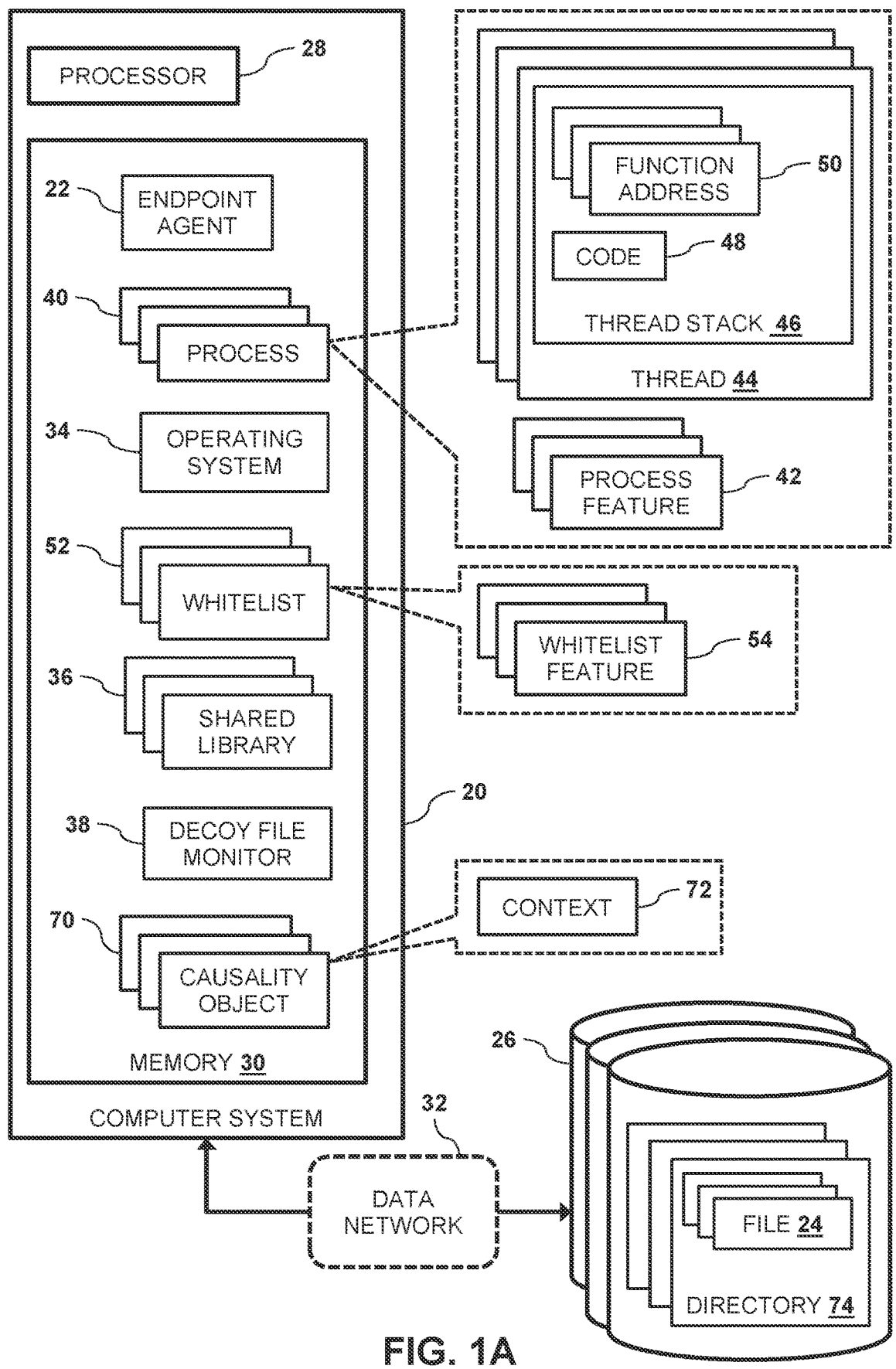
FIGS. 1A and 1B, also referred to collectively herein as FIG. 1, are block diagrams that schematically illustrate a computing system configured to detect a ransomware attack, in accordance with an embodiment of the present invention.

One example of protecting a computer system from ransomware attacks is to store and monitor decoy files on the computer system. Decoy files are strategically named so that they are inviting targets for a ransomware attack. For example, the decoy files can masquerade as document and/or image files, and can be named so that they appear at the top of an alphabetical list of files in a directory.

By continuously monitoring the decoy files, the computer system can detect a ransomware attack by detecting any modification to any of the decoy files. Since the decoy files are strategically named, they will typically be the first files modified in a ransomware attack. Therefore, the computer system may be able to detect the ransomware attack before the attack can encrypt any personal and/or sensitive data.

While monitoring decoy files can be an effective tool for detecting a ransomware attack, the decoy files can be cumbersome to legitimate processes and to the user experience. In one example, backup and archive processes executing on the computer system may waste time and computing resources when processing the decoy files. In another example, a user of the computer system may be confused when the computer system presents the decoy files in a directory listing.

Embodiments of the present invention provide methods and systems for limiting the enumeration of decoy files to processes executing on a computer system. As described hereinbelow, a set of protected files and a decoy file are stored to a storage device coupled to the computer system. As described supra, any modification to the decoy file indicates a cyber-attack on the process computer system. Upon receiving a request from a p executing on the computing device to enumerate files stored on the storage device, the process can be analyzed so as to classify the process as either innocent or suspicious. Regardless of whether the process is classified as benign or suspicious, the protected files (i.e., not including the decoy file) are enumerated to the process. However, in embodiments of the present invention, the decoy file (along with the protected files) is enumerated to the process only if the process is classified as suspicious.

In some embodiments, the process can be analyzed using static and/or dynamic analysis. In additional embodiments, a preventive action can be initiated in response to classifying the process as suspicious. For example, the process classified as suspicious can be killed, along with its entire causality.

In further embodiments, modifications to the protected files performed by a process executing on the computer system can be monitored in order to detect a ransomware attack. As described hereinbelow, upon detecting a process executing on the computing device performing a specific type of modification to a number of files stored on the storage device, the detected number can be compared to a specified threshold. A preventive action can be initiated in response to determining that the detected number exceeds the specified threshold.

System Description

Figure 1B:
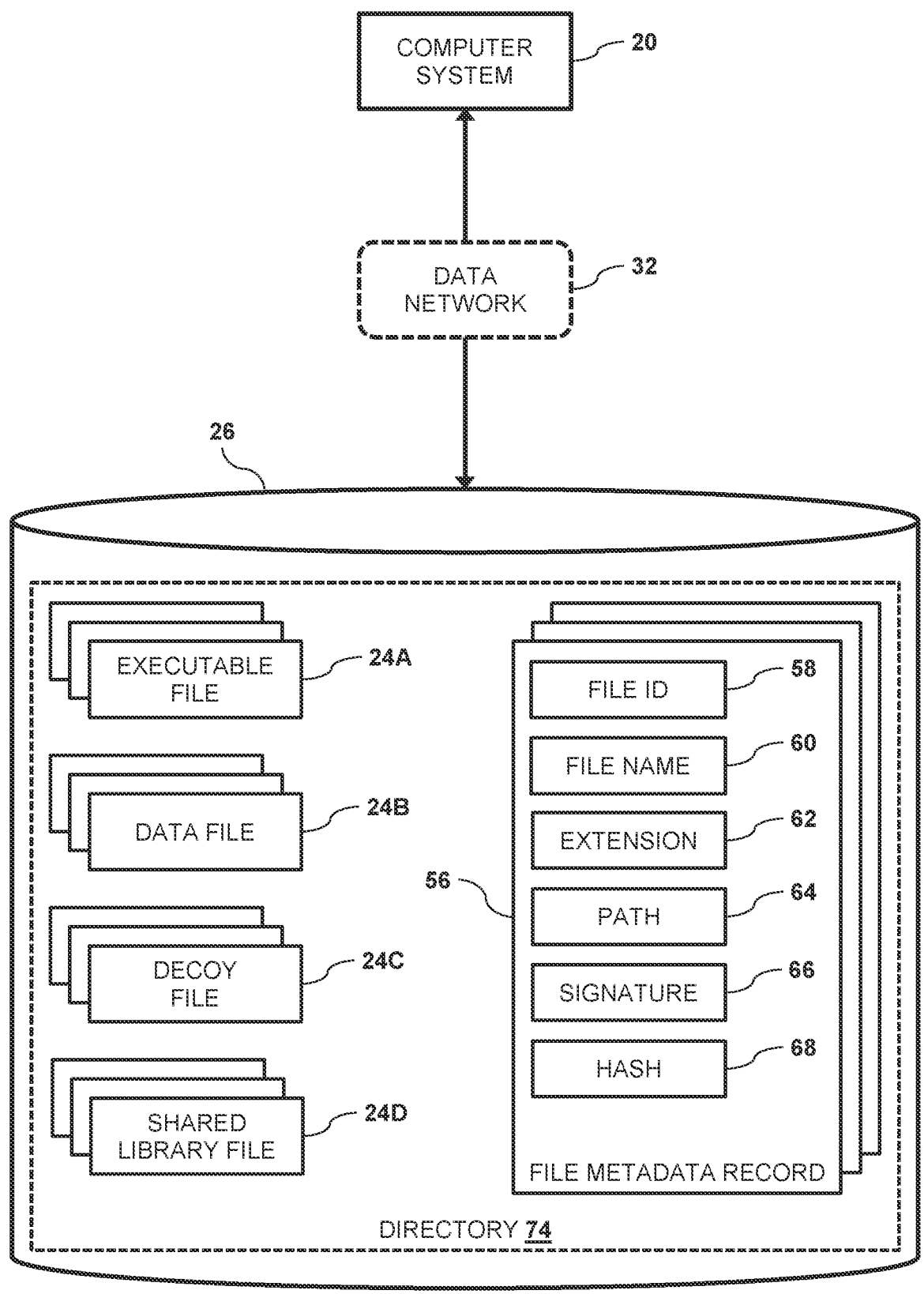

FIGS. 1A and 1B, referred to collectively herein as FIG. 1, are block diagrams that schematically show an example of a computer system 20 that executes an endpoint agent 22 that can detect a ransomware attack on files 24 stored on one or more storage devices 26 coupled to the computer system, in accordance with an embodiment of the present invention. Hardware and software components of computing system 20 are presented in FIG. 1A, and data components stored on storage device 26 are presented in FIG. 1B.

In FIG. 1B, files 24 can be differentiated by appending a letter to the identifying numeral, so that the files comprise:

Program executable files 24A. Program executable files 24A are used to perform various functions or operations on computer system 20. An example of a given program executable file is calc.exe, a calculator application produced by Microsoft Corporation, One Microsoft Way, Redmond, WA 98052 USA.

Data files 24B. Data files 24B store data that can be accessed by program files 24A. Examples of data files 24B include, but are not limited to document files, spreadsheet files, presentation files, image files and video files.

Decoy files 24C. As described supra, decoy files are used to detect ransomware attacks.

Shared library files 4D. Shared library files 24D libraries that are loaded by program files 24A when they start executing. When a shared library is installed and configured properly, files all program 24A can automatically use the shared library.

While embodiments herein describe protected files 24A, 24B and 24D, using embodiments of the present invention to protect any other type of file 24 is considered to be within the spirit and scope of the present invention.

Computer system 20 comprises a processor 28 and a memory 30. In one embodiment computer system 22 is directly connected to storage device 26, e.g., via a parallel ATA interface or a serial ATA interface. In another embodiment, storage device 26 can be a component of a storage system (not shown) that computer system 20 can access over a data network 32 such as a local area network.

An example of endpoint agent 22 is XDR™ produced by Palo Alto Networks, Inc. of 3000 Tannery Way, Santa Clara, CA 95054 USA.

In operation, processor 28 can execute, from memory 30, an operating system 34, shared libraries 36, a decoy file monitor 38, endpoint agent 22 and additional processes 40, each of the processes having one or more respective features 42. Features 42 are described in the description referencing FIG. 3 hereinbelow.

In some embodiments, processor 28 can load each shared library 36 to memory 30 from a respective shared library file 24D. If operating system 34 comprises Microsoft Windows™, then shared libraries 36 may comprise dynamic-link libraries (DLLs). Decoy file monitor 38 monitors any changes to decoy files 24C so as to detect a ransomware attack, as described supra.

During execution on processor 28, each process 40 may comprise one or more threads 44. Each thread 44 comprises a thread stack 46 that may comprise executable code 48 and one or more function addresses 50. In some embodiments, each function address 50 comprises an address, in memory 30, of a given shared library 36.

In some embodiments, as described in the description referencing FIG. 3 hereinbelow, endpoint agent 22 can use one or more whitelists 52 when performing a static analysis of a given process 40. Each whitelist 52 comprises a set of whitelist features 54. Examples of whitelist features 54 are described hereinbelow.

In the configuration shown in FIG. 1B, data storage device 26 can store a set of file metadata records 56, wherein each given file metadata record 56 corresponds to a given file 24. For each given file 24, the corresponding file metadata record 56 can store information such as:

A unique file identifier (ID) 58 that references the given file.

A file name 60 for the given file.

An extension 62 for the given file. In some embodiments, extension 62 may indicate a file type (e.g., an image or a spreadsheet) for the given file.

A path 64 for the given file indicating a location of the given file on a given storage device 26.

A signature 66 of the given file.

A hash value 68 for the given file.

In the configuration shown in FIG. 1A, memory 30 may also store one or more causality objects 70. In some embodiments, endpoint agent 22 can analyze processes 40 and threads 44, and store respective contexts 72 of the threads and the processes to causality objects 70. Endpoint agent 22 can then track and preserve the contexts between threads 44 and the processes within which they execute.

In operation, endpoint agent 22 can track processes 40 and threads 44 executing on processor 28, and group them into multiple causalities 70 (i.e., where X caused Y). The causalities are based on tracking information that endpoint agent 22 collects for events that occur in computer system 20. Endpoint agent 22 can track and store contexts 72 for causalities 70 by monitoring activity such as creation of processes 40, injection of threads 44 and remote procedure call actions.

In some embodiments, processor 28 can store files 24 in one or more directories 74 on storage device 26. In embodiments described herein, a given directory 74 that stores at least one decoy file 24C may be referred to as a protected directory 74.

Processor 28 may comprise a general-purpose central processing unit (CPU) or a special-purpose embedded processor, which is programmed in software or firmware to carry out the functions described herein. This software may be downloaded to computer system 22 in electronic form, over a network, for example. Additionally or alternatively, the software may be stored on tangible, non-transitory computer-readable media, such as optical, magnetic, or electronic memory media. Further additionally or alternatively, at least some of the functions of processor 28 may be carried out by hard-wired or programmable digital logic circuits.

Examples of memory 30 include dynamic random-access memories and non-volatile random-access memories. Storage devices 26 may comprise non-volatile storage devices such as hard disk drives and solid-state disk drives.

In some embodiments, the tasks of endpoint agent 22 executing on processor 28 as described herein may be performed by a data cloud-based application that executes externally to computer system 20.

Ransomware Detection

Figure 2:
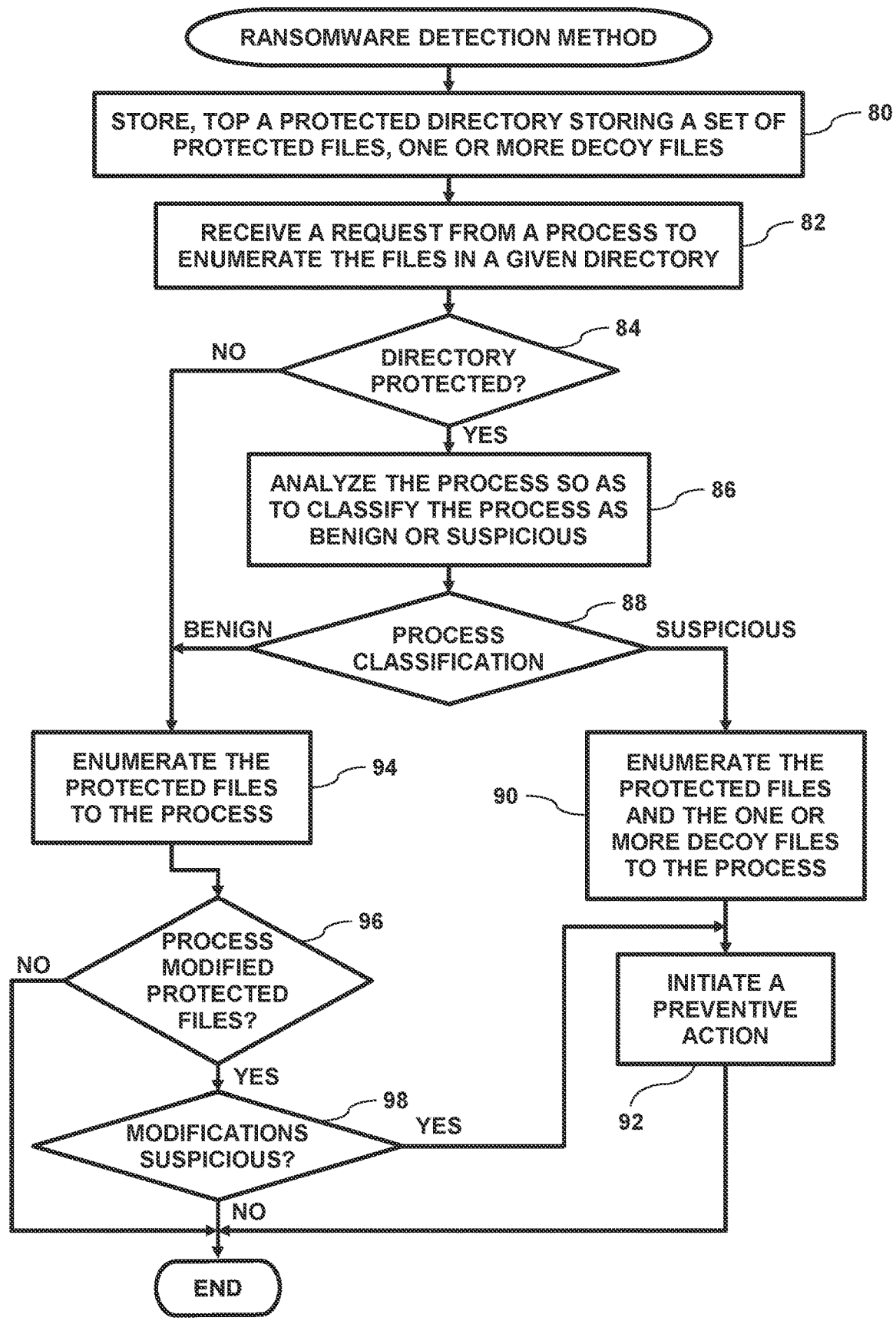
FIG. 2 is a flow diagram that schematically illustrates a method of detecting, on the computer system, a process that is initiating a ransomware attack, in accordance with an embodiment of the present invention.

FIG. 2 is a flow diagram that schematically illustrates a method of using decoy files 24C to detect a cyber-attack such as a ransomware attack on computer system 20, in accordance with an embodiment of the present invention. In embodiments of the present invention, the operations performed by endpoint agent 22 as described in the description referencing the flow diagrams hereinbelow may also be described as being performed by processor 28.

In step 80, processor 28 stores a set of files 24 to a given directory 74, wherein at least one of the files in the set comprises a given decoy file 24C, and wherein the remaining files in the set comprise non-decoy files 24 (i.e., files 24A, 24B and 24D). In embodiments of the present invention, the given directory is protected if at least one of the files stored to the given directory comprises a given decoy file 24C. Additionally, any files 24A, 24B and 24D (plus any other non-decoy files 24) in the given directory may be referred to as protected files 24.

In step 82, processor 28 receives a request from a given process 40 to enumerate the files in a given directory 74. In embodiments of the present invention, endpoint agent 22 can detect the request from the given process, and the endpoint agent executing on processor 28 can perform steps 84-98 described hereinbelow.

In step 84, endpoint agent 22 determines whether or not the given directory is protected. In some embodiments, as described supra, endpoint agent 22 can classify the given directory as protected if the given directory stores at least one decoy file 24C.

If the given directory is protected, then in step 86 endpoint agent 22 analyzes the given process so as to classify the given process as either benign or suspicious. In embodiments described herein, endpoint agent 22 can analyze the given process by analyzing the given process in memory 30 and/or analyzing a given executable file 24A that operating system 34 loaded into the memory in order to launch the given process. In some embodiments, endpoint agent 22 can analyze the given process by performing a static analysis and/or a dynamic analysis of the given process. An example of a static analysis that endpoint agent 22 can perform on the given process is described in the description referencing FIG. 3 hereinbelow, and an example of a dynamic analysis that endpoint agent 22 can perform on the given process is described in the description referencing FIG. 4 hereinbelow.

In step 88, if endpoint agent 22 classifies the given process as suspicious, then in step 90, the endpoint agent can enumerate all the files (i.e., both the protected files and the decoy files) in the given directory to the given process. In embodiments of the present invention, endpoint agent 22 enumerates decoy file(s) 24C to the given process only upon classifying the given process as suspicious.

Typically, the given process conveys the request to the operating system. Therefore, endpoint agent 22 can enumerate all the files in the given directory by conveying an instruction to operating system 34 to enumerate, to the given process, all the files in the given directory in response to the received request.

In step 92, endpoint agent 22 initiates a preventive action in response to classifying the given process as suspicious, and the method ends. In one embodiment, endpoint agent 22 can perform the preventive action by terminating the given process. In another embodiment, in addition to terminating the given process, endpoint agent 22 can identify and initiate the preventive action on a causality chain for the given process. The causality chain comprises additional processes 40 that are associated with the given process. Identifying the causality chain is described in the description referencing FIG. 4 hereinbelow.

Returning to step 88, if endpoint agent 22 classifies the given process as benign, then in step 94 the endpoint agent can enumerate (only) all the protected files (i.e., and not including the decoy files) in the given directory to the given process. Enumerating the files is described in the description referencing step 90 hereinabove.

In step 96, endpoint agent 22 monitors the process, to determine if the given process modified any of the protected files in the given directory. If endpoint agent 22 determines that the given process modified any of the protected files, then in step 98, the endpoint agent analyzes the modifications to the protected: files to classify the modifications as either suspicious or benign. Analyzing the modifications to the protected files made by the given process is described in the description referencing FIG. 5 hereinbelow.

If the endpoint agent classifies the modifications are suspicious, then the method continues with step 90. However, if endpoint agent 22 determines that the modifications are benign, then the method ends.

Returning to step 96, if endpoint agent 22 determines that the given process did not modify any of the protected files in the given directory, then the method ends.

Returning to step 84, if endpoint agent 22 determines that the given directory is not protected, then the method continues with step 94.

Figure 3:
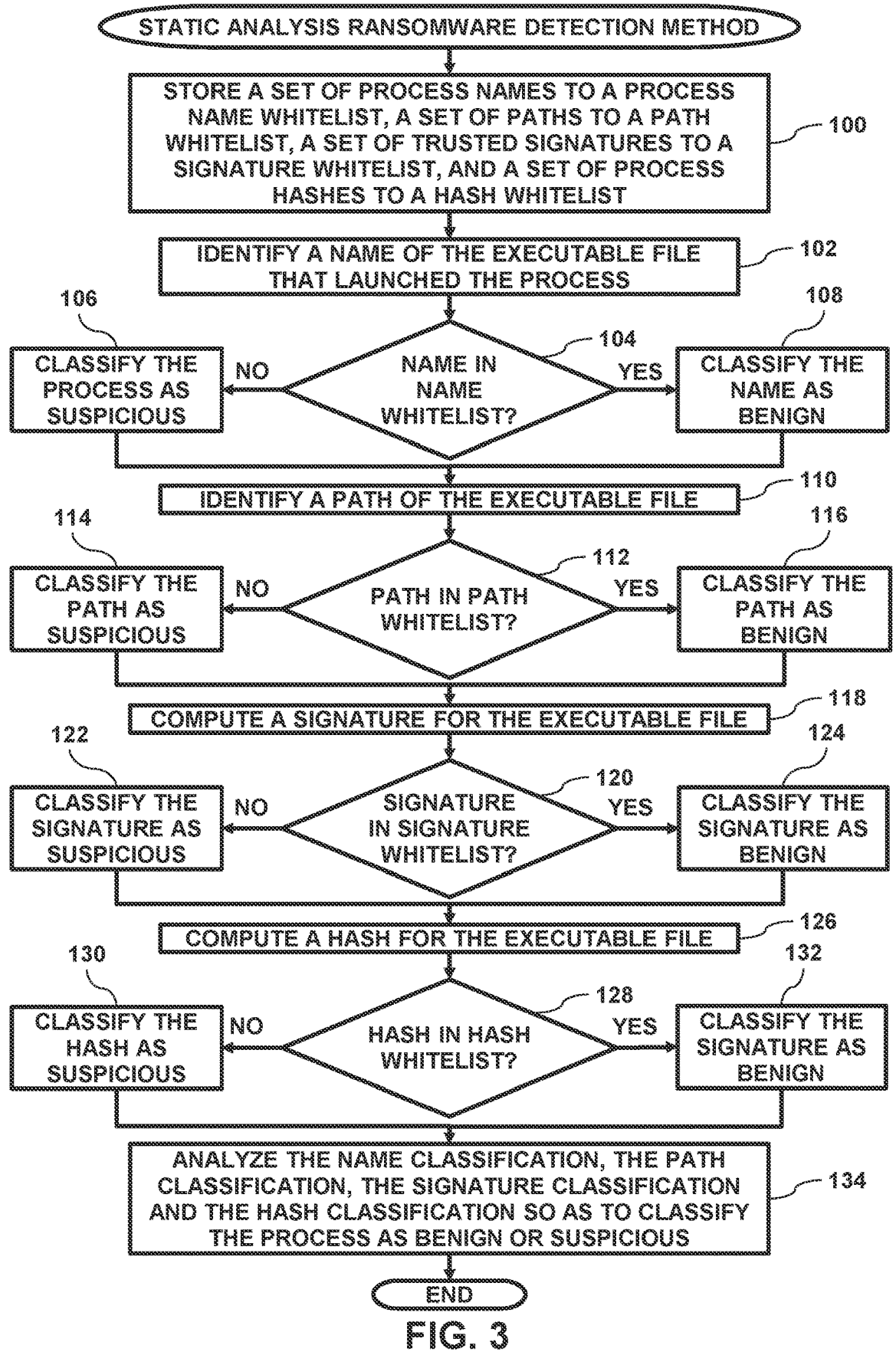
FIG. 3 is a flow diagram that schematically illustrates a method of detecting the ransomware attack by performing a static analysis on the process, in accordance with an embodiment of the present invention.

FIG. 3 is a flow diagram that schematically illustrates a method of detecting a ransomware attack by performing a static analysis on the given process (i.e., the process that generated the request in step 82 of FIG. 2), in accordance with an embodiment of the present invention. In embodiments described herein endpoint agent 22 can perform the static analysis by identifying one or more features 42 from the given process, and comparing the identified features to whitelist features 54 in one or more whitelists 52, as described hereinbelow.

As described in the description n referencing FIG. 1 hereinabove, each whitelist 52 comprises a list of whitelist features 54. Examples of features include, but are not limited to, process names, process paths, trusted signatures and process hash values.

In step 100, endpoint agent 22 stores a set of whitelisted names to the whitelist features in a first given whitelist 52, stores a set of whitelisted paths to the whitelist features in a second given whitelist 52, stores a set of whitelisted trusted signatures to the whitelist features in a third given whitelist 52, and stores a set of whitelisted hashes to the whitelist features in a fourth given whitelist 52. In embodiments herein, the whitelisted features in the first given whitelist may also be referred to as whitelisted names 54, the whitelisted features in the second given whitelist may also be referred to as whitelisted paths 54, the whitelisted features in the third given whitelist may also be referred to as whitelisted signatures 54, and the whitelisted features in the fourth given whitelist may also be referred to as whitelisted hash values 54.

In step 102, endpoint agent 22 identifies the file name of a given file 24A that the endpoint agent loaded into memory so as to launch the given process. To identify the file name, endpoint agent 22 can identify a given executable file 24A that the endpoint agent loaded into memory 30 and started executing so as to launch the given process, identify the corresponding file metadata record 56 for corresponding file metadata record given executable e file, and retrieve file name 60 from the corresponding file metadata record.

In step 104, endpoint agent 22 compares the retrieved file name to the whitelisted names in the first given whitelist. If endpoint agent 22 does not find any given whitelisted name 54 matching the retrieved file name, then in step 106, the endpoint agent classifies the retrieved file name as suspicious. However, if endpoint agent 22 finds a given whitelisted name 54 matching the retrieved file name, then in step 108, the endpoint agent classifies the retrieved name as benign.

In step 110, endpoint agent 22 identifies the path of a given file 24A that the endpoint agent loaded into memory so as to launch the given process. To identify the path, endpoint agent 22 can identify a given executable file 24A that the endpoint agent loaded into memory 30 and started executing so as to launch the given process, identify the corresponding file metadata record 56 for corresponding file metadata record given executable file, and retrieve path 64 from the corresponding file metadata record.

In step 112, endpoint agent 22 compares the retrieved path to the whitelisted paths in the second given whitelist. If endpoint agent 22 does not find any given whitelisted path 54 matching between the retrieved path and, then in step 114, the endpoint agent classifies the retrieved path as suspicious. However, if endpoint agent 22 finds a given whitelisted path 54 matching retrieved file name, then in step 116, the endpoint agent 22 classifies the retrieved path as benign.

In step 118, endpoint agent 22 computes a signature of a given file 24A that the endpoint agent loaded into memory so as to launch the given process. To compute the signature, endpoint agent 22 can identify a given executable file 24A that the endpoint agent loaded into memory 30 and started executing so as to launch the given process, compute the signature for the given executable file, identify the corresponding file metadata record 56 for corresponding file metadata record given executable file, and store the computed signature to signature 66 in the corresponding file metadata record.

In step 120, endpoint agent 22 compares the computed signature to the whitelisted signatures in the third given whitelist. If endpoint agent 22 does not find any given whitelisted signature 54 matching the computed signature, then in step 122, the endpoint agent 22 classifies the computed signature as suspicious. However, if endpoint agent 22 finds a match a given whitelisted signature 54 matching the computed signature, then in step 124, the endpoint agent 22 classifies the computed signature as benign.

In another embodiment, endpoint agent 22 can retrieve a given signature 66 from a given file 24, and authenticate the retrieved signature (i.e., in addition to or as an alternative to computing comparing the computed signatures to the whitelisted signatures, as described supra). In this embodiment, memory 30 can store trusted certificate authorities (not shown) for certificates (not shown), and endpoint agent 22 can authenticate the given signature by mathematically validating the given signature.

For example, if the given signature is said to be for Company X, and the certificate authority (CA) that issued the given signature is Company Y (which is a trusted CA on the computer system), then operating system 24 classifies the certificate as valid. Once operating system 24 classifies the certificate as valid, endpoint agent 22 can also check whether Company X is in a given whitelist 52. Typically, an attacker cannot fake/re-use real certificates on its own malicious files, as the signature generation/validation process s requires a private key (i.e., for asymmetric encryption) in order to be able to successfully sign any file 24.

In step 126, endpoint agent 22 computes a hash value for a given executable file 24A that the endpoint agent 22 loaded into memory so as to launch the given process. To compute the hash value, endpoint agent 22 can identify a given executable file 24A that the endpoint agent loaded into memory 30 and started executing so as to launch the given process, compute the hash value for the given executable file using a function such as SHA256 or MD5, identify the corresponding file metadata record 56 for corresponding file metadata record given executable file, and store the computed hash value to hash value 68 in the corresponding file metadata record.

In step 128, endpoint agent 22 compares the computed hash value to the whitelisted hash values in the fourth given whitelist. If endpoint agent 22 does not find any given whitelisted hash value 54 matching the computed hash value and, then in step 130, the endpoint agent classifies the computed hash value as suspicious. However, if endpoint agent 22 finds a given whitelisted signature 54 matching the computed hash value, then in step 132, the endpoint agent classifies the computed hash value as benign.

Finally, in step 134, endpoint agent 22 analyzes the classified name, the classified path, the classified signature and the classified hash so as to classify the given process as either benign or suspicious. In one embodiment, endpoint agent 22 may classify the given process as benign if all the classifications are benign. Likewise, endpoint agent 22 may classify the given process as suspicious if all the classifications are suspicious.

In another embodiment, endpoint agent 22 may apply one or more rules to the classifications so as to classify the given process as either benign or suspicious. In a first example, endpoint agent 22 can classify the given process as benign if the endpoint agent loaded the given executable file from a specific whitelisted path 54 (e.g., "C: \Program Files"). In a second example, endpoint agent 22 can classify the given process as benign if the computed signature for given executable file matches a specific whitelisted signature 54. In a third example, endpoint agent 22 can classify the given process as benign if the name for given executable file matches a specific whitelisted name 54 and the computed signature for given executable file matches a specific whitelisted signature 54.

Figure 4:
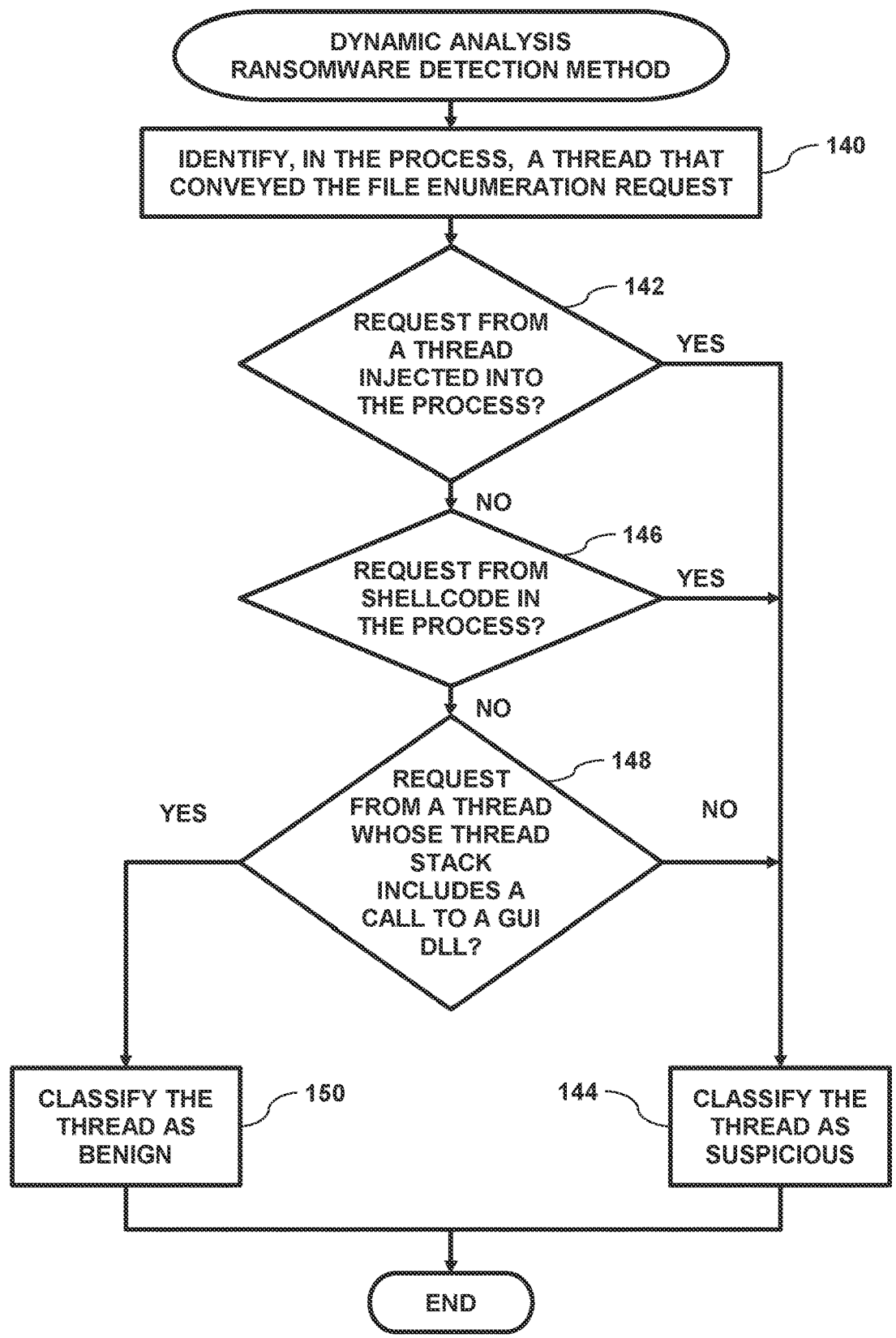
FIG. 4 is a flow diagram that schematically illustrates a method of detecting the ransomware attack by performing a dynamic analysis on the process, in accordance with an embodiment of the present invention.

FIG. 4 is a flow diagram that schematically illustrates a method of detecting a ransomware attack by performing a dynamic analysis on the given process, in accordance with an embodiment of the present invention. In one embodiment endpoint agent 22 can perform the dynamic analysis on any given process 40 that conveyed a request to enumerate the files in a given directory 74. In another embodiment, endpoint agent 22 can perform the dynamic analysis (only) on the given process if the static analysis (i.e., as described in the description referencing FIG. 3 hereinabove) classified the given process as benign.

In step 140, endpoint agent 22 identifies a given thread 44 in the given process (i.e., the process that conveyed the request in the description referencing step 82 in FIG. 2 hereinabove). In some embodiments, endpoint agent 22 can identify then given thread by "hooking" (i.e., intercepting), from data structures (not shown) in operating system 34, an identity of any given thread 44 that is currently executing on processor 28 and requesting access to any given file 24 or the enumeration of the files in any given directory 74.

In step 142 endpoint agent 22 determines whether or not the given thread was injected into the given process (e.g., by an additional malicious process 40). To determine whether or not the given thread was injected into the given process, endpoint agent 22 can hook an internal function (not shown) in operating system 34 (e.g., CreateRemoteThread in Microsoft Windows™) that a given malicious process 40 used to inject the given thread into the given process.

If endpoint agent 22 determines that the given thread was injected into the given process, then in step 144, the endpoint agent can classify the given thread as suspicious, and the method ends. However, if endpoint agent 22 determines that the given thread was not injected into the given process, then in step 146, the endpoint agent determines whether or not the given thread d comprises shellcode. Shellcode comprises computer executable code that starts a command shell from which an attacker can control computer system 20. To detect shellcode in the given thread, endpoint agent 22 can identify, by monitoring internals of operating system 34, properties of a region in memory 30 from which the given thread is running, and detect that the properties enable a malicious process 40 to insert its "shellcode" into the given process.

If endpoint agent 22 determines that the given thread comprises shellcode, then the method continues with step 142. However, if endpoint agent 22 determines that the given thread does not comprise shellcode, then in step 148, the endpoint agent determines whether or not the thread stack of the given thread comprises a given function address 50 that matches an address, in memory 30, of a given shared library 36 (e.g., a DLL) for a graphical user interface (GUI). The rationale for this step is that malware typically limits its operation modifying one or more files 24, and therefore typically does not include code to perform a task such as presenting file names in a GUI.

If endpoint agent 22 determines that the thread stack of the given thread comprises a given function address 50 that matches an address of a given shared library 36 for a GUI, then in step 150, the endpoint agent can classify the given thread as benign, and the method ends. In embodiments described herein, a given thread comprises a given function address 50 that matches an address of a given shared library 36 for a GUI may also be referred to as a GUI thread. However, if endpoint agent 22 determines that the thread stack of the given thread does not comprise a given function address 50 that matches an address of a given shared library 36 for a GUI, then the method continues with step 142.

For each given process 40, operating system 34 typically maintains a mapping between each given shared library (e.g., a DLL) and a respective virtual memory address. Endpoint agent 22 can use these mappings to translate every virtual address in the thread stack's state when the given thread requests to enumerate files 24. If endpoint agent 22 detects, at a certain distance on the stack from the current code location (i.e., of the given thread), any address which is mapped to a given DLL which is in a given whitelist 52 of DLLs (e.g., x.dll, b.dll), then the endpoint agent can classify the given thread as a GUI thread.

As described in the description referencing FIG. 2 hereinabove, endpoint agent 22 can identify and initiate the preventive action on a causality chain for the given process. In one embodiment, endpoint agent 22 can identify the causality chain by analyzing the respective context 72 for the given process. In this embodiment, upon classifying a given thread 44 as malicious, endpoint agent 22 can use its respective context 72 to identify any additional malicious threads 44 and any additional malicious processes 40 in the causality chain for this malicious thread is a part, and initiate the preventive action (i.e., as described in the description referencing step 92 in FIG. 2 hereinabove) for the identified malicious threads and processes.

While the malicious thread typically "lives" in a given process that is also malicious, there are instances where which malicious threads 44 that perform malicious activities run inside legitimate processes 40. In such cases, only the malicious threads are killed, but the legitimate processes (and additional legitimate threads inside them) are kept alive. Thus, endpoint agent 22 can thus identify instances where malicious threads 44 are created by malicious processes 40, but employ operating system supported techniques (such as thread injection and reflective loading) to run inside legitimate processes 40.

Figure 5:
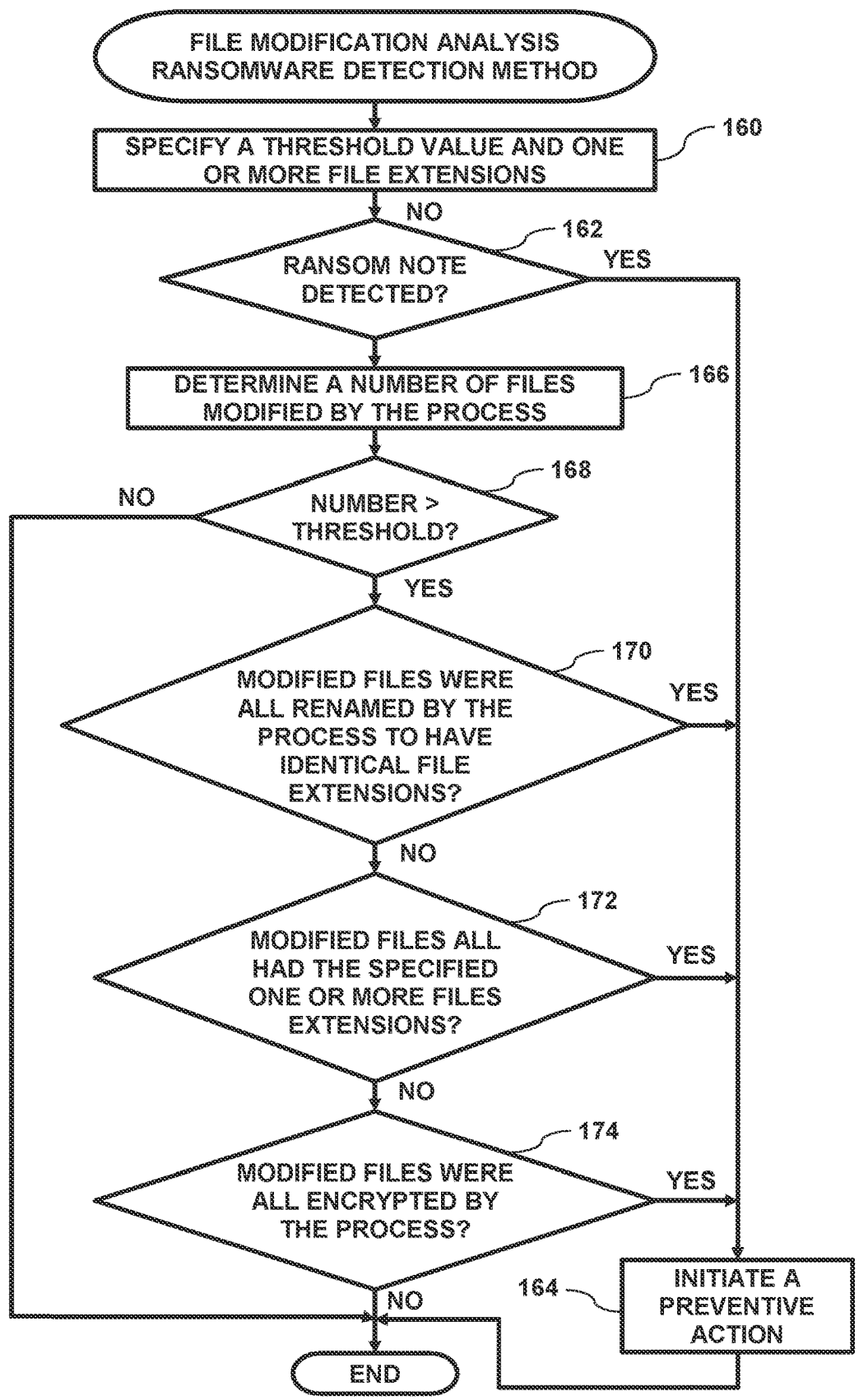
FIG. 5 is a flow diagram that schematically illustrates a method of detecting the ransomware attack by analyzing files modified by the process, in accordance with an embodiment of the present invention.

FIG. 5 is a flow diagram that schematically illustrates a method of detecting a ransomware attack by analyzing files 24 modified by the given process, in accordance with an embodiment of the present invention. The steps described in FIG. 5 can be performed independently of the classification performed by the static and dynamic analyses described supra.

In step 160, endpoint agent 22 specifies a threshold value and one or more file extensions. Typically, a ransomware attack only targets data files 24A that store user/corporate data. Therefore, the specified file extensions can be file extensions used for documents (e.g., ".doc"), spreadsheets (e.g., ".xls") and images (e.g., ".jpg").

In step 162, endpoint agent 22 determines whether or not the given process generated a ransom demand. In one embodiment, the ransom demand may comprise a ransom note stored in a given file 24 that includes details on the ransomware attack, and details on how make a ransom payment in exchange for a decryption key for the files encrypted in the attack. In some embodiments, endpoint agent 22 can classify a given file 24 as a ransom demand by detecting a specific file name (e.g., "restore_files_rvrk.html", "confirmation.key", "last_chance.txt" or "recovery_key.txt"), or by detecting, in the given file 24, specific phrases such as "Your important files are encrypted" or keywords such as "bitcoin", "encrypted" and "payment".

If endpoint agent 22 detects that the given process generated a ransom note, then in step 164, the endpoint agent initiates a preventive action on the given process, and the method ends. Initiating a preventive action on the given process is described in the description referencing step 92 in FIG. 2 hereinabove.

If endpoint agent 22 does not detect that the given process generated a ransom note, then in step 166, the endpoint agent determines a number of files 24 that were modified by the given process, and compares the determined number to the specified threshold.

In step 168, if the determined number of files 24 that were modified by the given process is greater than the specified threshold, then in step 170, the endpoint agent determines whether or not the modifications comprised modifying the files so that they all had identical file extensions 62.

If endpoint agent 22 determines that the modifications comprised modifying the files so that they all had identical file extensions 62, then the method continues with step 164. However, if endpoint agent 22 determines that the modifications did not comprise modifying the files so that they all had identical file extensions 62, then in step 172, the endpoint agent determines whether or not the modifications comprised renaming the files so that they all had file extensions 62 matching any of the file extensions specified in step 160.

If endpoint agent 22 determines that the modifications comprised renaming the files so that they all had file extensions 62 matching any of the specified file extensions, then the method continues with step 164. However, if endpoint agent 22 determines that the modifications did not comprise renaming the files so that they all had file extensions 62 matching any of the specified file extensions, then in step 174, the endpoint agent determines whether or not the modifications comprised encrypting the files.

If endpoint agent 22 determines that the modifications comprised encrypting the files, then the method continues with step 164. However, if endpoint agent 22 determines that the modifications did not comprise encrypting the files, then the method ends. In some embodiments, endpoint agent 22 can detect if a given file 24 was encrypted using techniques such as Chi Square Distribution, Monte-Carlo Pi Approximation, and entropy analysis. In additional embodiments, endpoint agent 22 can detect if a given file 24 was encrypted by analyzing headers of the given file so as to determine a file type (i.e., for the given file).

In operation, a given file 24 may have one or more headers, each of the headers storing file meta-data (which is different for every file type). Specifically, there are file types that are by default compressed/encrypted (e.g., .JPEG/.JPG image files and Microsoft's .docx files). Typically, endpoint agent 22 can determine the file type of a given file 24 by parsing the file header(s) of the given file, as the file extension is not a reliable indicator.

Returning to step 168, if the determined number of files 24 that were modified by the given process is not greater than the specified threshold, then the method ends.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for protecting a computer system coupled to a storage device, comprising:
 specifying one or more original file extensions that are applied in naming files that store documents, spreadsheets, or images;
 detecting an executing process that performed a specific type of modification to a number of files stored on the storage device, wherein the specific type of modification includes renaming respective file extensions of the files having one of the specified original file extensions from the one of the specified original file extensions to a new file extension;
 comparing, by a processor, the detected number of files to a specified threshold; and
 initiating, on the executing process, a preventive action in response to determining that the detected number exceeds the specified threshold,
 wherein initiating the preventive action comprises identifying a causality chain for the executing process by analyzing a context of a thread of the executing process that was found to be malicious, applying the analyzed context to identify additional malicious threads in the causality chain, and applying the preventive action to all the identified threads in the causality chain.

2. The method according to claim 1, wherein initiating the preventive a comprises terminating the executing process and the threads in the causality chain.

3. The method according to claim 1, wherein the specific type of modification comprises renaming the file extensions of the files to identical file extensions.

4. The method according to claim 1, wherein the specific type of modification comprises encrypting the files.

5. The method according to claim 4, wherein detecting the executing process comprises parsing headers of the files to detect that the files have been encrypted.

6. An apparatus for protecting a computer system, comprising:
 a storage device configured to store a plurality of files;
 a memory; and
 a processor configured:
  to receive one or more specified original file extensions that are applied in naming files that store documents, spreadsheets, or images,
  to detect, in the memory, an executing process that performed a specific type of modification to a number of files stored on the storage device, wherein the specific type of modification includes renaming respective file extensions of the files having one of the specified original file extensions from the one of the specified original file extensions to a new file extension,
  to compare, the detected number of files to a specified threshold; and
  to initiate, on the executing process, a preventive action in response to determining that the detected number exceeds the specified threshold,
 wherein the processor is configured to initiate the preventive action by identifying a causality chain for the executing process by analyzing a context of a thread of the executing process that was found to be malicious, applying the analyzed context to identify additional malicious threads in the causality chain, and applying the preventive action to all the identified threads in the causality chain.

7. The apparatus according to claim 6, wherein the preventive action comprises terminating the executing process and the threads in the causality chain.

8. The apparatus according to claim 6, wherein the specific type of modification comprises renaming the file extensions of the files to identical file extensions.

9. The apparatus according to claim 6, wherein the specific type of modification comprises encrypting the files.

10. The apparatus according to claim 9, wherein the processor is configured to detect the executing process by parsing headers of the files to detect that the files have been encrypted.

11. A computer software product for protecting a computing system, the product comprising a non-transitory computer-readable medium, in which program instructions are stored, which instructions, when read by a computer, cause the computer:
- to receive one or more specified original file extensions that are applied in naming files that store documents, spreadsheets, or images;
- to detect an executing process that performed a specific type of modification to a number of files stored on a storage device, wherein the specific type of modification includes renaming respective file extensions of the files having one of the specified original file extensions from the one of the specified original file extensions to a new file extension;
- to compare the detected number of files to a specified threshold; and
- to initiate, on the executing process, a preventive action in response to determining that the detected number exceeds the specified threshold, wherein the instructions cause the computer to initiate the preventive action by identifying a causality chain for the executing process by analyzing a context of a thread of the executing process that was found to be malicious, applying the analyzed context to identify additional malicious threads in the causality chain, and applying the preventive action to all the identified threads in the causality chain.

12. The product according to claim 11, wherein the specific type of modification comprises renaming the file extensions of the files to identical file extensions.

13. The product according to claim 11, wherein the specific type of modification comprises encrypting the files.

14. The product according to claim 13, wherein the instructions cause the computer to detect the executing process by parsing headers of the files to detect that the files have been encrypted.

* * * * *